(12) United States Patent
Chen et al.

(10) Patent No.: US 6,232,616 B1
(45) Date of Patent: May 15, 2001

(54) LCD PANEL TEST APPARATUS

(75) Inventors: Chung-Yea Chen; Ching-Yuan Liu; Rui-Yang Chen, all of Taipei (TW)

(73) Assignee: Inventec Corporation (TW)

( * ) Notice: Subject to any disclaimer, the term of this patent is extended or adjusted under 35 U.S.C. 154(b) by 0 days.

(21) Appl. No.: 09/287,346

(22) Filed: Apr. 7, 1999

(30) Foreign Application Priority Data

Jul. 24, 1998 (TW) .................................................. 87212085

(51) Int. Cl.[7] .......................... G01N 21/88; G01N 21/01; G02F 1/13
(52) U.S. Cl. ...................... 250/559.45; 356/244; 349/192
(58) Field of Search ............................ 356/375, 237.2, 356/244, 394; 250/559.45, 559.29; 349/192; 348/92, 93, 125

(56) References Cited

U.S. PATENT DOCUMENTS 5,032,735 * 7/1991 Kobayashi et al. ................... 356/394
5,387,788 * 2/1995 Miller et al. ........................ 250/201.1
5,825,500 * 10/1998 Iino et al. ............................. 356/394

* cited by examiner

Primary Examiner—Frank G. Font
Assistant Examiner—Zandra V. Smith
(74) Attorney, Agent, or Firm—Finnegan, Henderson, Farabow, Garrett & Dunner L.L.P.

(57) ABSTRACT

An LCD panel test apparatus for testing a liquid crystal display (LCD) panel of a notebook computer by a photo detector. The LCD panel test apparatus includes a base, a moving device, a rotary device and a clamping holder. The moving device is disposed on the base and is provided with a mounting portion for mounting the photo detector. The position of the photo detector can be changed by the movement of the moving device. The rotary device is disposed on the base. The clamping holder, for clamping the notebook computer, is disposed on the rotary device. The position of the notebook computer can be changed by the rotation of the rotary device and the clamping holder. Therefore, the LCD panel can be tested at different angles. As a result, the brightness testing of the LCD panel can be performed easily and accurately.

8 Claims, 4 Drawing Sheets

LCD PANEL TEST APPARATUS

FIELD OF THE INVENTION

The present invention relates to an LCD (liquid crystal display) panel test apparatus. In particular, it relates to an apparatus for automatically testing an LCD panel to detect defects of the LCD panel by providing a mechanism for moving a photo detector and rotating the LCD panel.

DESCRIPTION OF PRIOR ART

An LCD panel is compact, light, ergonomic, and non-radiative. Thus, it has been widely applied to notebook computers.

However, when a user operates the notebook computer, he has to adjust the LCD panel to a proper angle since the LCD panel is easily influenced by the environment. If the quality of the LCD panel can be assured, the influence by the environment to the LCD panel can be minimized.

In testing the LCD panel to detect defects such as display unevenness, a test apparatus as shown in FIG. 4 has been used to conduct various tests.

The conventional apparatus as shown in FIG. 4 includes a polarizing plate 110 provided above the LCD panel 100 to be tested, a polarizing plate 120 provided below the LCD panel 100, a back light 130 provided under the polarizing plate 120, a camera 160 to monitor light signals passing through the polarizing plate 110, a polarizing plate 190 mounted on the same plane of the polarizing plate 110, and a polarizing plate driver 210.

The LCD test apparatus as shown in FIG. 4 further includes an analog-digital converter 170 to convert an analog signal from the camera 160 into digital data, an image processing CPU 200 which processes the digital data from the analog-digital converter 170, an LCD pattern generator 180 to generate a display pattern for the LCD panel 100 to be tested, and an LCD panel driver 150 which provides a drive signal to drive the LCD panel 100 to be tested through contact units 140.

Therefore, in the conventional LCD panel test methods, the LCD panel test apparatus is capable of automatically testing an LCD panel by means of rotating one or more polarizing plates with respect to the LCD panel. However, both the LCD panel to be tested and the camera are fixed; thus, the LCD panel tested by the conventional LCD panel test apparatus can only be tested at one angle. As a result, the conventional LCD panel test apparatus can not provide the testing indicating how different angles influence the quality of the LCD panel.

SUMMARY OF THE INVENTION

It is therefore an object of the invention to provide an LCD panel test apparatus that can eliminate the above problems in the prior art.

It is another object of the present invention to provide an LCD panel test apparatus that is capable of automatically testing an LCD panel to detect brightness defects of the LCD panel at different angles.

It is a further object of the present invention to provide an LCD panel test apparatus that is capable of testing an LCD panel with high efficiency without being subject to the errors caused by an operator when he manually moves the LCD panel.

To this end, according to the invention, there is provided an LCD panel test apparatus for testing a liquid crystal display (LCD) panel of a notebook computer by a photo detector. The LCD panel test apparatus includes a base, a moving device, a rotary device and a clamping holder. The moving device is disposed on the base and is provided with a mounting portion for mounting the photo detector. The position of the photo detector can be changed by the movement of the moving device. The rotary device is disposed on the base. The clamping holder, for clamping the notebook computer, is disposed on the rotary device. The relative position between the notebook computer and the photo detector can be changed by the movement of the moving device and the rotation of the rotary device and the clamping holder.

According to an aspect of the invention, the moving device further comprises at least one first moving portion, a second moving portion and a third moving portion. The first moving portion is disposed on the base. The second moving portion is disposed on the first moving portion and is capable of moving on the first moving portion along a first direction. The third moving portion is disposed on the second moving portion and is capable of moving on the second moving portion along a second direction perpendicular to the first direction. The mounting portion is attached to the third moving portion and is capable of moving along an axis perpendicular to both the first direction and the second direction.

According to an aspect of the invention, the LCD panel test apparatus further comprises a rotary table, a first step motor, a second step motor, a third step motor, a fourth step motor and an index plate. The rotary table is disposed on the base and is connected to the first moving portion for controlling the movement of the second moving portion. The first step motor is disposed on and connected to the third moving portion for controlling the movement of the mounting portion. The second step motor is disposed on and connected to the second moving portion for controlling the movement of the third moving portion. The third step motor is disposed on the rotary device and is connected to the clamping holder for controlling the rotation of the clamping holder. The index plate is disposed on the base and is connected to the rotary device. The fourth step motor is disposed on the base and is connected to the index plate for controlling the rotation of the rotary device.

BRIEF DESCRIPTION OF THE DRAWINGS

The present invention is hereinafter described in detail by the preferred embodiments with reference to the accompanying drawings wherein.

DETAILED DESCRIPTION OF THE PREFERRED EMBODIMENTS

Figure 1:
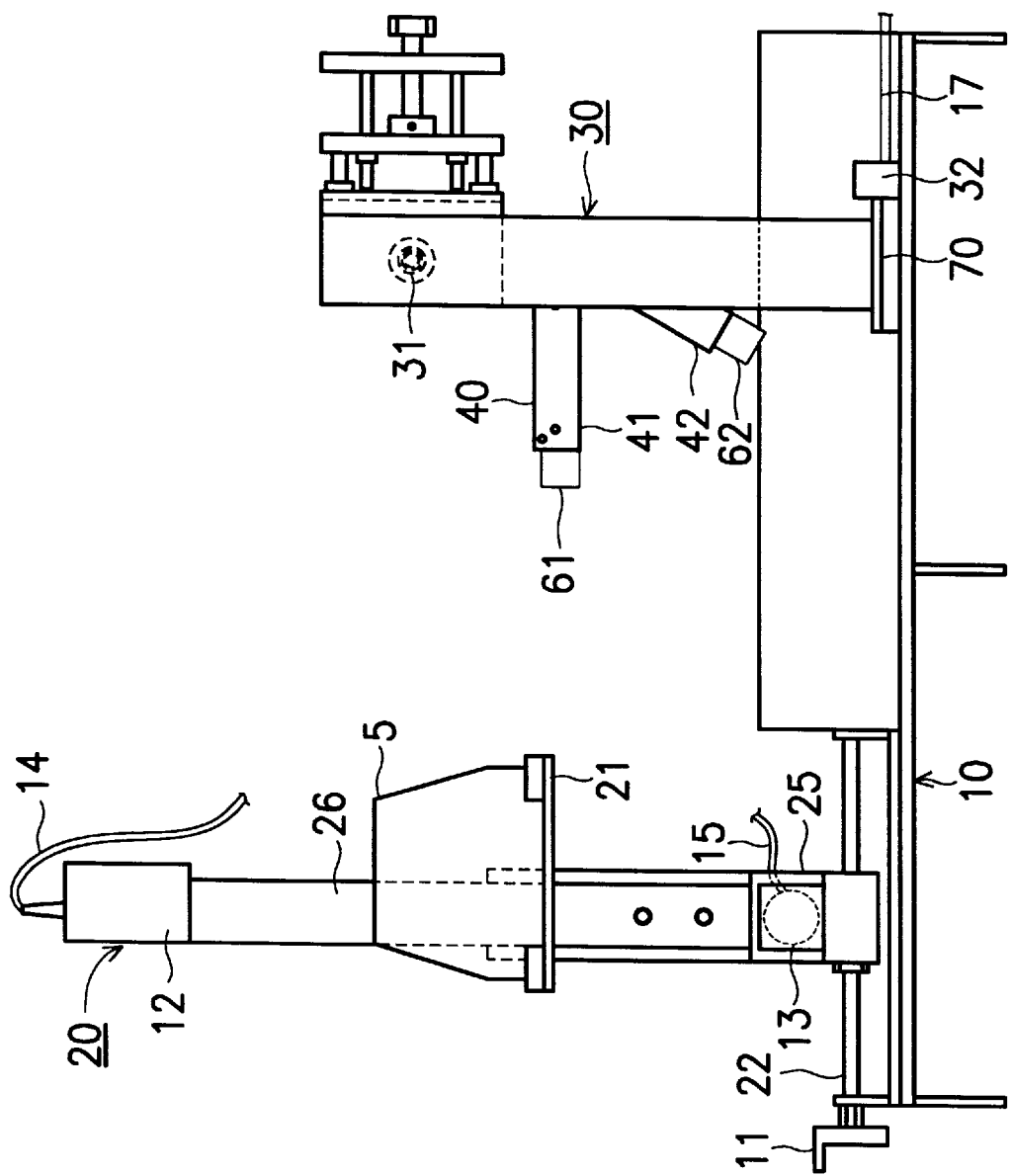
FIG. 1 is a side view showing the LCD panel test apparatus according to the present invention, wherein a photo detector and a notebook computer are positioned on the mounting portion and the clamping holder respectively.
Figure 2:
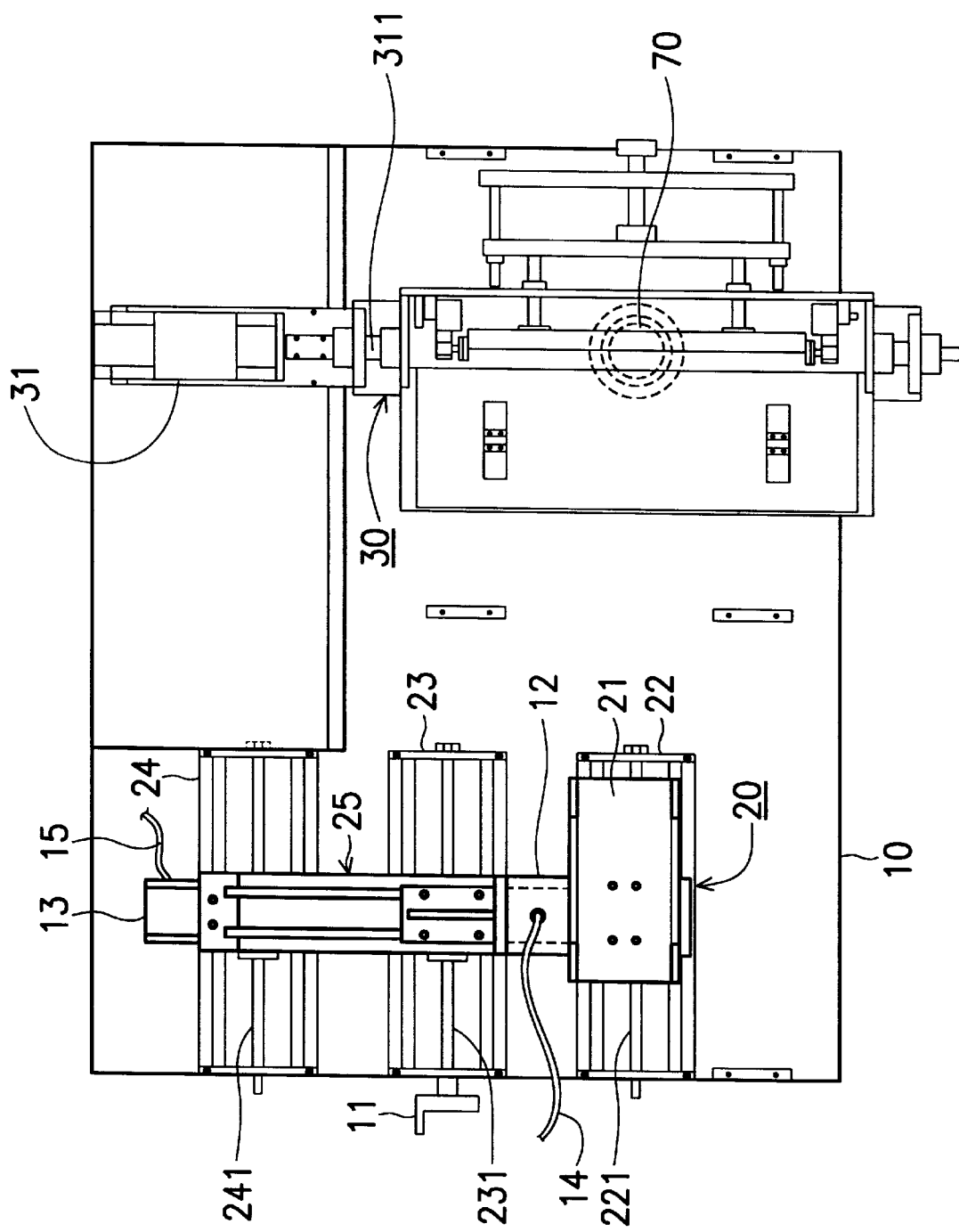
FIG. 2 is a top view showing the LCD panel test apparatus according to the present invention.
Figure 3:
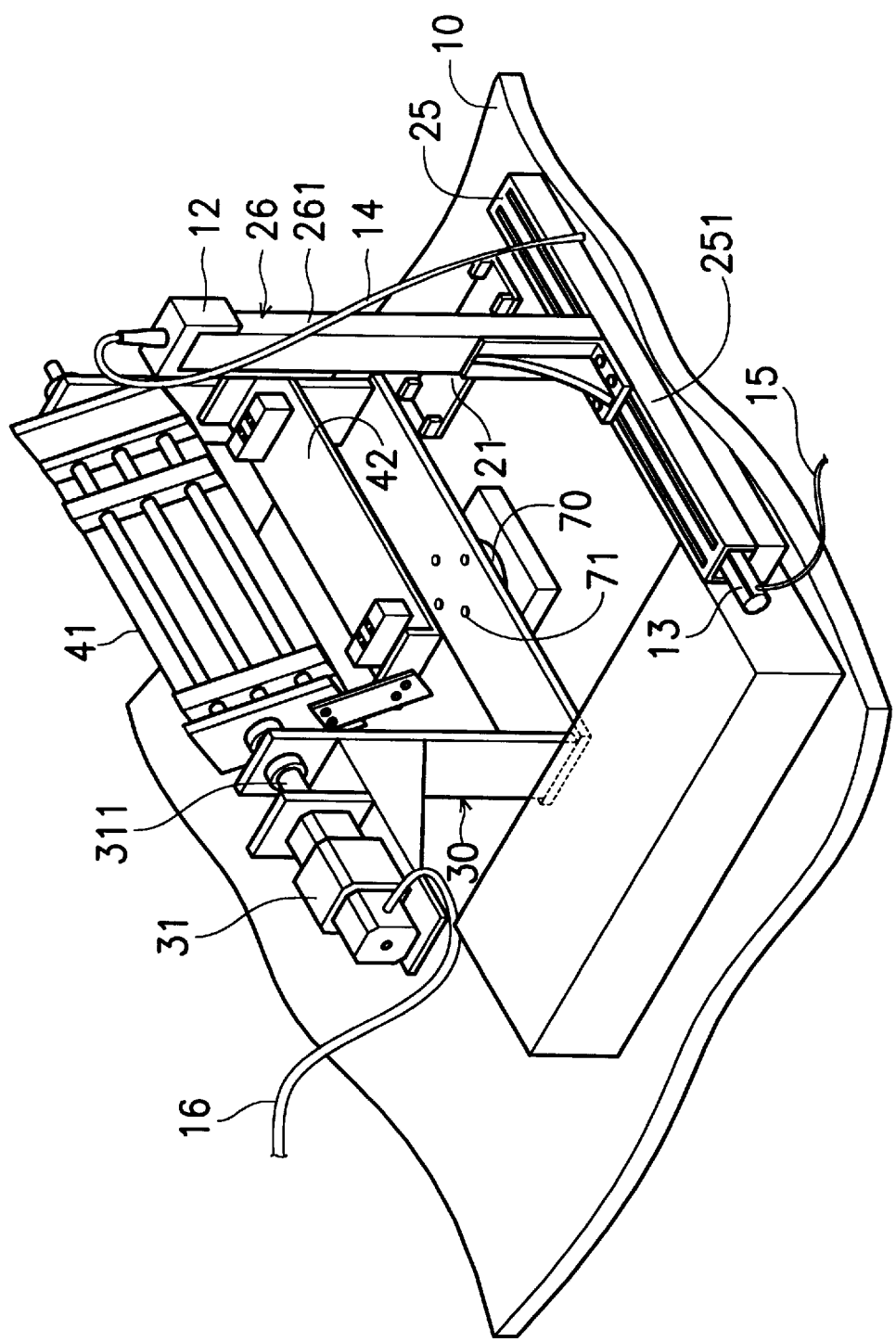
FIG. 3 is a partially perspective view showing the LCD panel test apparatus according to the present invention.
Figure 4:
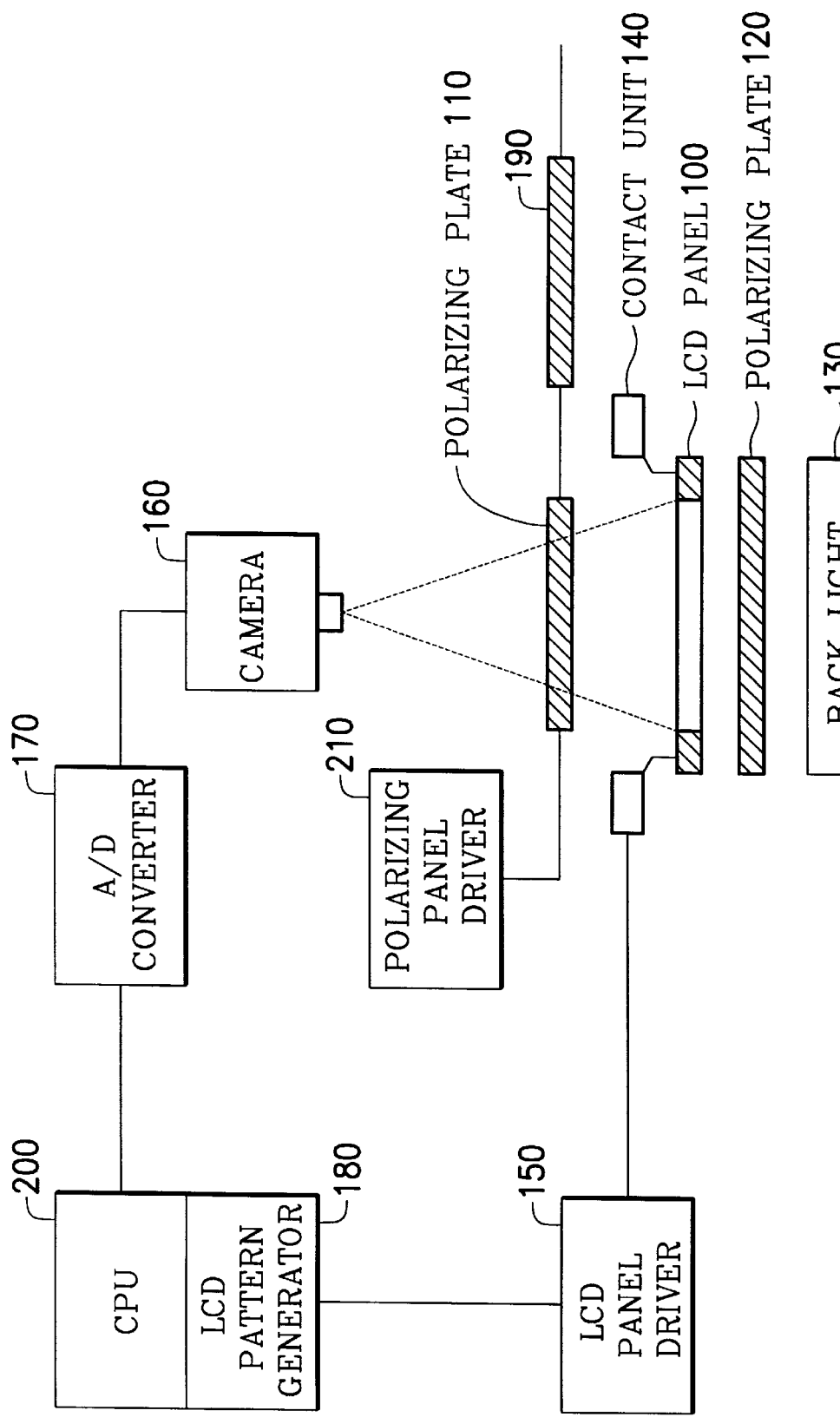
FIG. 4 is a block diagram showing a structure of a conventional LCD panel test apparatus.

Referring to FIGS. 1, 2 and 3, FIG. 1 is a side view showing a liquid crystal display (LCD) panel test apparatus according to the present invention. FIG. 2 is a top view showing the LCD panel test apparatus according to the present invention. FIG. 3 is a partially perspective view showing the LCD panel test apparatus according to the present invention.

As shown in the figures, the LCD panel test apparatus of the present invention consists mainly of a base 10, a moving device 20, a rotary device 30 and a clamping holder 40. The clamping holder 40 is positioned on the rotary device 30 and consists of a first holder 41 for fixing the LCD panel 61 of a notebook computer and a second holder 42 for fixing a main portion 62 of a notebook computer.

The moving device 20 includes: three first moving portions 22, 23, 24, a second moving portion 25, a third moving portion 26 and a mounting portion 21. The first moving portions 22, 23, 24 are positioned on the base 10. The second moving portion 25 is positioned on the first moving portions 22, 23, 24. The third moving portion 26 is positioned on the second moving portion 25. The mounting portion 21 is positioned on the third moving portion 26. Furthermore, a photo detector 5 can be disposed on the mounting portion 21.

The first moving portions 22, 23, 24 are each provided with a guide screw 221, 231, 241, respectively. The bottom surface of the second moving portion 25 is engaged with the guide screws 221, 231, 241. As a result, the second moving portion 25 can move on the first moving portions 22, 23, 24 along a first direction.

The second moving portion 25 is also provided with a guide screw (not shown). The guide screw of the second moving portion 25 is positioned inside the housing 251 of the second moving portion 25. The bottom portion of the third moving portion 26 is engaged with the guide screw of the second moving portion 25. Thus, the third moving portion 26 can move on the second moving portion 25 along a second direction perpendicular to the first direction.

The third moving portion 26 is also provided with a guide screw (not shown). The guide screw of the third moving portion 26 is positioned inside the housing 261 of the third moving portion 26. One portion of the mounting portion 21 is engaged with the guide screw of the third moving portion 26. Thus, the mounting portion 21 can move on the third moving portion 26 along a axis perpendicular to both the first direction and the second direction. Therefore, the photo detector 5 disposed on the mounting portion 26 can move in three different directions by means of the moving device 20.

The LCD panel test apparatus further comprises a first step motor 12, a second step motor 13 and a rotary table 11. The first step motor 12 is positioned on the third moving portion 26 and is electrically connected to a controller (not shown) via a wire 14. The output shaft (not shown) of the first step motor 12 is connected to the guide screw, engaged with the mounting portion 21, of the third moving portion 26; thereby, the operator uses the controller to adjust the movement of the mounting portion 21 by means of the first step motor 12.

The second step motor 13 is positioned on the second moving portion 25 and is electrically connected to a controller via a wire 15. The output shaft (not shown) of the second step motor 13 is connected to the guide screw of the second moving portion 25, said guide screw being engaged with the third moving portion 26; consequently, the operator uses the controller to adjust the movement of the third moving portion 26 by means of the second step motor 13.

The rotary table 11 is positioned on the base 10 and is connected to the guide screws 221, 231, 241, engaged with the second moving portion 25, of the first moving portion 24. The operator uses the rotary table 11 to manually adjust the movement of the second moving portion 25.

Furthermore, the LCD panel test apparatus comprises a third step motor 31 with a retarder and a fourth step motor 32 with an index plate 70. The retarder is combined with the step motor 31. The index plate 70 is positioned on the base 10. In addition, the rotary device 30 and the index plate 70 are screwed together by means of four screws 71.

The third step motor 31 is positioned on the rotary device 30 and is electrically connected to a controller via a wire 16. The output shaft 311 of the third step motor 31 is connected to the first holder 41; as a result, the operator uses the controller to adjust the rotation of the clamping holder 40 by means of the third step motor 31.

The fourth step motor 32 is disnosed on the base 10 and is connected to the index plate 70 and is electrically connected to a controller via a wire 17. The rotary device 30 and the index plate 70 are screwed together; hence, the operator uses the controller to adjust the rotation of the rotary device 30 by means of the fourth step motor 32.

The main elements of the LCD panel test apparatus of the present invention are explained above. The LCD panel test method will be described below. It comprises the following steps:

(a) The photo detector and the notebook computer are positioned on the mounting portion and the clamping holder, respectively.

(b) The LCD panel of the notebook computer is programmed to illuminate at a certain portion. Then, the brightness of the illuminating portion is measured by the photo detector as a reference value.

(c) The relative position between the photo detector and the LCD panel is changed by the movement of the moving device and the rotation of the rotary device and the clamping holder.

(d) The brightness of the illuminating portion is measured by the photo detector.

(e) Steps (c) and (d) are repeated until the minimum brightness is detected. Thereby, the quality of the LCD panel is determined.

Specifically, the quality of the LCD panel can be determined according to various manners as follows:

(1) The positions of the LCD panel and the photo detector are kept unchanged. Only the illuminating portion of the LCD panel is changed.

(2) The illuminating portion of the LCD panel and the position of the photo detector are kept unchanged. Only the position of the LCD panel is changed.

(3) The illuminating portion of the LCD panel and the position of the LCD panel are kept unchanged. Only the position of the photo detector is changed.

Since the position of the LCD panel can be changed by the rotation of the rotary device and the position of the photo detector can be moved in three directions by the movement of the moving device, the quality of the LCD panel can be tested at different angels.

As has been described in the foregoing, according to the present invention, the LCD panel test apparatus is capable of automatically testing an LCD panel to detect brightness defects of the LCD panel. The LCD panel test apparatus of the present invention is capable of automatically testing an LCD panel by means of rotating the LCD panel or moving the photo detector. In fact, brightness defects of the LCD panel, which are relatively difficult to detect, can be detected.

In summary, the LCD panel test apparatus of the present invention can be used for testing the LCD panel with high efficiency and reliability without being subject to errors caused by the operator when he manually moves the LCD panel.

The foregoing description of the preferred embodiment of the present invention has been provided for the purpose of illustration and description. It is not intended to be exhaustive or to limit the invention to the precise forms disclosed. Many modifications and variations will be apparent to practitioners skilled in the art. The embodiments were chosen and described to best explain the principles of the invention and its practical application, thereby enabling others skilled in the art to understand the invention to practice various other embodiments and make various modifications suited to the particular use contemplated. It is intended that the scope of the invention be defined by the following claims and their equivalents.

What is claimed is:

1. An LCD panel test apparatus for testing a liquid crystal display (LCD) panel of a notebook computer by a photo detector, comprising:

a base;

a moving device disposed on the base, said moving device having a mounting portion for mounting the photo detector, wherein the position of the photo detector can be changed by the movement of the moving device;

a rotary device disposed on the base; and a clamping holder, for clamping the notebook computer, disposed on the rotary device, wherein the relative position between the notebook computer and the photo detector can be changed by the movement of the moving device and the rotation of the rotary device and the clamping holder.

2. The apparatus as claimed in claim 1, wherein the moving device further comprises at least a first moving portion, a second moving portion, and a third moving portion, the first moving portion being disposed on the base, the second moving portion being disposed on the first moving portion and being capable of moving on the first moving portion along a first direction, the third moving portion being disposed on the second moving portion and being capable of moving on the second moving portion along a second direction perpendicular to the first direction, and the mounting portion being attached to the third moving portion and being capable of moving along an axis perpendicular to both the first direction and the second direction.

3. The apparatus as claimed in claim 2, further comprising a rotary table disposed on the base and connected to the first moving portion for controlling the movement of the second moving portion.

4. The apparatus as claimed in claim 2, further comprising a first step motor disposed on and connected to the third moving portion for controlling the movement of the mounting portion.

5. The apparatus as claimed in claim 2, further comprising a second step motor disposed on and connected to the second moving portion for controlling the movement of the third moving portion.

6. The apparatus as claimed in claim 2, further comprising a third step motor disposed on the rotary device and connected to the clamping holder for controlling the rotation of the clamping holder.

7. The apparatus as claimed in claim 2, further comprising an index plate disposed on the base and connected to the rotary device.

8. The apparatus as claimed in claim 2, further comprising a fourth step motor disposed on the base and connected to the index plate for controlling the rotation of the rotary device.

* * * * *